(12) United States Patent
Bronk

(10) Patent No.: US 11,740,979 B2
(45) Date of Patent: Aug. 29, 2023

(54) METHODS AND APPARATUS TO FACILITATE DISTRIBUTED DATA BACKUP

(71) Applicant: Intel Corporation, Santa Clara, CA (US)

(72) Inventor: Mateusz Bronk, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/928,837

(22) Filed: Jul. 14, 2020

(65) Prior Publication Data

US 2021/0165718 A1   Jun. 3, 2021

Related U.S. Application Data

(63) Continuation of application No. 16/014,494, filed on Jun. 21, 2018, now Pat. No. 10,719,410, which is a
(Continued)

(51) Int. Cl.
*G06F 9/00* (2006.01)
*G06F 15/177* (2006.01)
(Continued)

(52) U.S. Cl.
CPC ........ *G06F 11/1464* (2013.01); *G06F 9/4416* (2013.01); *H04L 9/3263* (2013.01);
(Continued)

(58) Field of Classification Search
None
See application file for complete search history.

(56) References Cited

U.S. PATENT DOCUMENTS 7,757,295 B1   7/2010   Hadaaegh
7,844,251 B2   11/2010   Chen et al.
(Continued)

FOREIGN PATENT DOCUMENTS

CN   103229165   7/2013
CN   103959302   7/2014

OTHER PUBLICATIONS

International Searching Authority, "Search Report," issued in connection with PCT patent application No. PCT/US2016/057681, dated Jan. 26, 2017, 5 pages.
(Continued)

*Primary Examiner* — Mohammed H Rehman
(74) *Attorney, Agent, or Firm* — Hanley, Flight & Zimmerman, LLC

(57) ABSTRACT

Methods, apparatus, systems and articles of manufacture are disclosed to facilitate distributed data backup. An example apparatus includes a controller to detect a trigger event for a distributed backup mode; and, in response to detection of the trigger event, trigger the distributed backup mode. When in the distributed backup mode, the controller of the example apparatus is to identify one or more receiving devices within communication range of the apparatus available to receive a data backup from the apparatus. The example apparatus includes a data distributor to distribute data from the apparatus among the one or more receiving devices. The controller of the example apparatus is to confirm receipt of the distributed data by the one or more receiving devices.

20 Claims, 10 Drawing Sheets

Related U.S. Application Data continuation of application No. 14/976,359, filed on Dec. 21, 2015, now Pat. No. 10,007,577.

(51) Int. Cl.

| | | |
|---|---|---|
| *G06F 11/14* | (2006.01) | |
| *H04L 9/40* | (2022.01) | |
| *H04L 9/32* | (2006.01) | |
| *G06F 9/4401* | (2018.01) | |
| *H04W 4/70* | (2018.01) | |
| *H04W 12/04* | (2021.01) | |
| *H04W 12/033* | (2021.01) | |
| *H04W 4/90* | (2018.01) | |
| *H04W 4/06* | (2009.01) | |
| *H04W 12/02* | (2009.01) | |

(52) U.S. Cl.
CPC ........ *H04L 63/0428* (2013.01); *H04L 63/062* (2013.01); *H04W 4/70* (2018.02); *H04W 12/033* (2021.01); *H04W 12/04* (2013.01); *G06F 2201/80* (2013.01); *H04L 63/0823* (2013.01); *H04W 4/06* (2013.01); *H04W 4/90* (2018.02); *H04W 12/02* (2013.01)

(56) References Cited

U.S. PATENT DOCUMENTS

| | | | |
|---|---|---|---|
| 7,987,325 B1* | 7/2011 | Patil | G06F 11/1448 |
| | | | 711/161 |
| 8,825,921 B2 | 9/2014 | Westwick et al. | |
| 8,924,658 B1* | 12/2014 | Bairavasundaram | |
| | | | G06F 3/0611 |
| | | | 711/E12.001 |
| 9,087,069 B1* | 7/2015 | Thiam | G06F 11/1453 |
| 10,719,410 B2 | 7/2020 | Bronk | |
| 10,747,447 B1* | 8/2020 | Patwardhan | G06F 3/0608 |
| 2005/0010734 A1 | 1/2005 | Soejima et al. | |
| 2005/0233748 A1 | 10/2005 | Robinson et al. | |
| 2006/0069711 A1 | 3/2006 | Tsunekawa et al. | |
| 2007/0082613 A1 | 4/2007 | Cox | |
| 2008/0154989 A1* | 6/2008 | Arman | G06F 11/1464 |
| 2009/0034741 A1 | 2/2009 | Sabev | |
| 2009/0150185 A1* | 6/2009 | Lassetter | G16H 10/60 |
| | | | 705/2 |
| 2009/0177856 A1 | 7/2009 | Herne | |
| 2009/0315687 A1 | 12/2009 | Kanevsky et al. | |
| 2010/0121820 A1* | 5/2010 | Thapa | H04L 12/10 |
| | | | 707/641 |
| 2011/0078609 A1 | 3/2011 | Shibuya | |
| 2011/0109170 A1* | 5/2011 | Chen | G11B 19/043 |
| | | | 307/121 |
| 2012/0150808 A1 | 6/2012 | Hubner et al. | |
| 2013/0179011 A1 | 7/2013 | Colby et al. | |
| 2013/0325809 A1 | 12/2013 | Kim et al. | |
| 2014/0281477 A1 | 9/2014 | Nayshtut et al. | |
| 2014/0289202 A1 | 9/2014 | Chan et al. | |
| 2015/0026448 A1 | 1/2015 | Jiang et al. | |
| 2015/0149408 A1* | 5/2015 | Lin | G06F 11/1456 |
| | | | 707/610 |
| 2015/0170427 A1 | 6/2015 | Hansen et al. | |
| 2015/0230078 A1 | 8/2015 | Kandangath et al. | |
| 2015/0293817 A1* | 10/2015 | Subramanian | G06F 11/1448 |
| | | | 707/645 |
| 2017/0177449 A1 | 6/2017 | Bronk | |

OTHER PUBLICATIONS

International Searching Authority, "Written Opinion," issued in connection with PCT patent application No. PCT/US2016/057681, dated Jan. 26, 2017, 9 pages.

United States Patent and Trademark Office, "Non-Final Office Action," issued in connection with U.S. Appl. No. 14/976,359, dated Mar. 15, 2017, 9 pages.

United States Patent and Trademark Office, "Final Office Action," issued in connection with U.S. Appl. No. 14/976,359, dated Aug. 7, 2017, 9 pages.

United States Patent and Trademark Office, "Advisory Action," issued in connection with U.S. Appl. No. 14/976,359, dated Nov. 14, 2017, 5 pages.

United States Patent and Trademark Office, "Notice of Allowance," issued in connection with U.S. Appl. No. 14/976,359, dated Feb. 28, 2018, 6 pages.

International Bureau, "International Preliminary Report on Patentability," issued in connection with PCT Patent application No. PCT/US2016/057681, dated Jun. 26, 2018, 10 pages.

United States Patent and Trademark Office, "Non-Final Office action," issued in connection with U.S. Appl. No. 16/014,494, dated Nov. 13, 2019, 21 pages.

United States Patent and Trademark Office, "Notice of Allowance," issued in connection with U.S. Appl. No. 16/014,494, dated Mar. 6, 2020, 17 pages.

Chinese Patent Office, "Office action," issued in connection with CN patent application No. 201680067911.3, dated Oct. 2, 2021, 12 pages. Machine english translation.

\* cited by examiner

METHODS AND APPARATUS TO FACILITATE DISTRIBUTED DATA BACKUP

RELATED APPLICATION

This patent claims priority to U.S. patent application Ser. No. 16/014,494, filed on Jun. 21, 2018, entitled "METHODS AND APPARATUS TO FACILITATE DISTRIBUTED DATA BACKUP" Which claims the benefit of priority to Ser. No. 14/976,359 filed on Dec. 21, 2015, entitled "METHODS AND APPARATUS TO FACILITATE DISTRIBUTED DATA BACKUP." The entirety of U.S. patent application Ser. Nos. 14/976,359 and 16/014,494 are incorporated herein by reference.

FIELD OF THE DISCLOSURE

This disclosure relates generally to backup of data, and, more particularly, to methods and apparatus to facilitate distributed data backup.

BACKGROUND

In recent years, a number of electronic devices able to generate data has rapidly increased. Some devices capture information regarding their operating environment or operating parameters. Such information may impact proper equipment operation, troubleshooting of problems, post-mortem failure analysis, etc. Unfortunately, this information is often lost if the device is broken, destroyed, or otherwise lost.

Network connected devices have facilitated services for household members, building managers and/or businesses, in which the connected devices share information. Other devices, however, lack a network connection or may operate for periods of time disconnected from a network, rendering them unable to share information with other devices on the network.

DETAILED DESCRIPTION

Figure 1:
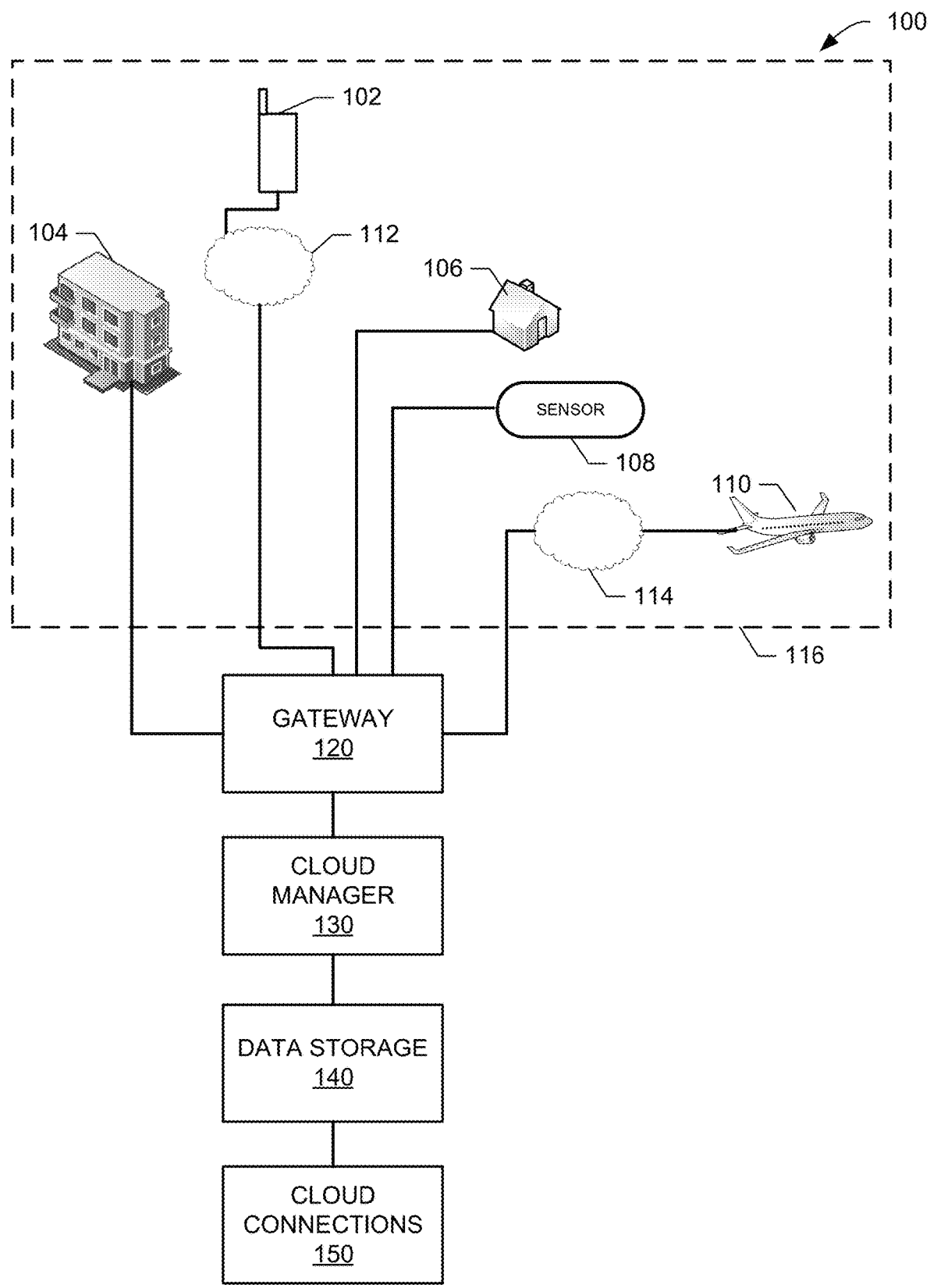
FIG. 1 is a schematic illustration of an example cloud infrastructure system to facilitate data collection and communication.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and/or other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

A number of electronic devices capable of generating data (e.g. environment characteristics, performance logs, operational metrics, etc.) is rapidly increasing. Many devices gather "mission-critical" information related to equipment operation, error troubleshooting, and/or after-the-failure post-mortem analysis. Unfortunately, even a robust device can break or be destroyed when exposed to external factors such as environment, improper use, normal wear, etc. If a data stream associated with that device has not been stored in a location outside the device, then the data is irrevocably lost.

For example, in an airplane crash, the aircraft's flight recorder maintains information regarding a sequence of events on the aircraft leading to the crash. However, while the flight recorder (also referred to as the 'black box') is durable and designed to survive significant impact, data on the recorder is often found unreadable. If the flight recorder is destroyed in a crash, its flight data is lost. Similarly, other electronic devices that produce and/or store important, operational data (e.g., 'mission-critical' data) but do not have access to ubiquitous network connectivity risk loss of data without an ability to create an off-site backup. Additionally, some electronic devices record data that is too large and/or too sensitive do maintain copy. For example, a jet engine may generate 10 terabytes (TB) of performance and operating condition data in approximately 30 minutes. Other thermometers, electric meters, brake assemblies, blood pressure gauges, routers, etc., generate and/or provide a conduit for valuable data. Some devices may not be allowed to connect to external systems during normal operation (e.g., "air-gapped" systems, etc.).

Increasing device data storage and communication capability through the "Internet of Things" further exacerbates this problem. The Internet of Things (IoT) refers to a network of physical devices that include electronics (e.g., sensors, software, network connectivity, etc.) which enable the devices to collect and exchange data. IoT focuses on devices talking with other devices and includes machine-to-machine communications (M2M) which allow wireless and/or wired devices to communicate with other devices of the same type. Energy efficiency and home security are two example markets in which IoT solutions and IoT devices have grown. As used herein, "IoT devices" or "networked devices" include (a) devices having sensors responsive to environmental conditions and/or actuators and (b) network connectivity to send/receive data from the sensors and/or actuators. As used herein, "IoT solutions" includes services that access, retrieve, receive and/or otherwise consume data from the networked devices (IoT devices). In some examples, a networked device includes an IoT thermostat, an IoT security device, an IoT door sensor, a mobile communication device (e.g., a smartphone), etc.

However, some electronic data-gathering devices (e.g., flight data recorders, wearable sensors, etc.) may not be IoT devices able to communicate with other devices. Additionally, IoT devices may be unable to communicate if they have been disconnected from their network(s) and/or prohibited by system configuration and/or policy from communicating with external devices. Often, a device's connection to the Internet, such as via a router, can be intermittent or otherwise weak.

For example, network connectivity may not always be available due to technical or business constraints (e.g., a device in a moving vehicle in which having a persistent satellite uplink is expensive and unreliable, etc.). Additionally, even durable and resilient storage may be lost (e.g., when a device sinks in the ocean). Rather than relying on dedicated storage, co-located devices or require network connectivity, certain examples leverage a device's surroundings to store data with other devices within communication range of the device in question. Some devices may not be allowed to connect to external systems during normal operation, but such devices may be able to enter a "panic" mode" to temporarily allow transfer of data with one or more external devices, for example.

As described further below, certain examples augment data backup by leveraging a device's surroundings (e.g., other devices within radio range) to provide data reliability, security, and redundancy in the event of an error, failure, emergency, and the like. As described further below, examples disclosed herein leverage a network of one or more nearby devices (e.g., devices within communication range) to create a distributed copy of stored and/or generated data (e.g., a data stream from an electronic device) at regular intervals and/or when an impending failure of the electronic device providing the data (referred to herein as the primary device, the mission-critical device, the data-generating device, etc.) is detected.

The primary device may be located within communication range of one or more other electronic devices (e.g., referred to herein as secondary devices, relay devices, receiving devices, etc.) during at least a portion of its operation. In certain examples, one or more of a plurality of secondary electronic devices includes data storage available and designated for write-access by an authorized remote node. The secondary device(s) can then receive a portion (also referred to herein as a data chunk) of an encrypted data stream from the primary device for storage at the secondary device. During recovery, an authorized party holding private keys to decrypt the encrypted data can use the data chunks from the secondary device(s) to reconstruct the original data stream from the primary device.

In certain examples, data can be redundantly distributed from a primary device across a set of several secondary devices using a replication factor (e.g., a replication factor of 2 to distribute two copies of the data, a replication factor of 3 to distribute three copies of the data, etc.). In certain examples, data distributed from the primary device to a secondary device can be further propagated to a tertiary device via a network, such as a mesh network for resiliency.

In certain examples, a receiving device is triggered to remotely attest to a broadcasting node before accepting a data stream from the broadcasting node (e.g., the primary device). A trigger can be generated by the primary device and/or based on operating and/or other environmental condition(s) to remotely 'wake up' the receiving device(s) to receive data in an emergency situation, for example.

Following proper attestation, one or more secondary receiving devices can be used to preserve the data stream of a 'dying' device (e.g., an electronic device suffering a critical error condition, physical damage, etc.). In some examples, a secondary device can store all or part of a data stream from a primary device without the secondary device having access to the content of the data stream or an identity of the source. Instead, the receiving device receives an indication the origin is legitimate and has been authorized to transmit (e.g., using an anonymous scheme such as Trusted Computing Group (TCG) Direct Anonymous Attestation (DAA) protocol, enhanced privacy ID (EPID), etc.). In some examples, the receiving device also receives an indication that the primary device is in distress or failure mode and is transmitting data for emergency storage at the receiving device. The data may be partitioned by the primary device into a plurality of portions or chunks so that no single receiving device receives a complete copy of the data (e.g., for security).

FIG. 1 is a schematic illustration of an example cloud infrastructure system 100 to facilitate communication and management of electronic devices (e.g., IoT devices, etc.). The example system 100 can be used to facilitate cloud-based and/or other IoT device communications and services, for example. In the illustrated example of FIG. 1, the system 100 includes a plurality of electronic devices 102-110. Various electronic device(s) 102-110 sense, filter, process, analyze, and/or actuate, for example, while securing and managing machines and data. The devices 102-110 communicate via one or more gateways 120. The gateway(s) 120 provide data and device management for the devices 102-110. For example, the gateway(s) 120 can support onboarding, monitoring, diagnostics, and/or remote control of devices 102-110 connected to the gateway(s) 120.

In some examples, one or more intermediary networks 112, 114 are used to interface between the electronic devices 102-110 (collectively referred to as data sources or data producing devices 116) and the gateway(s) 120. For example, a wide area network (WAN), local area network (LAN, sometimes also referred to as a home area network (HAN)), point-to-point connection, etc., can facilitate communication between device(s) 102-110 and the gateway 120 via WiFi™, cellular, Zigbee™, wired, and/or other communication, for example.

The gateway(s) 120 connect the devices 102-110 to a cloud manager 130. The cloud manager 130 works with the gateway(s) 120 to capture, filter, process, and store data from the devices 102-110. The cloud manager 130 can also facilitate a secure connection between devices 102-110 and legacy infrastructure. Additionally, the cloud manager 130 can help perform analytics (e.g., regarding usage, uptime, trends, histogram, etc.) at the edge of the cloud for the devices 102-110 via the gateway 120.

The cloud manager 130 facilitates storage of data from the devices 102-110 in a data storage 140. Data gathered from the devices 102-110 can be used by one or more third-party cloud connections 150 to provide actionable information and automate operations.

Both IoT and non-IoT devices can collect data and communicate via the cloud infrastructure system 100 of the example of FIG. 1. If connected to the system 100, data can be transferred from the device 102-110 to the data storage 140. However, sometimes a device 102-110 may lose its connection to the system 100 or may not be connected to the system 100 at all. Certain examples provide an ability to save data regardless of a device's connection to a larger system.

Figure 2:
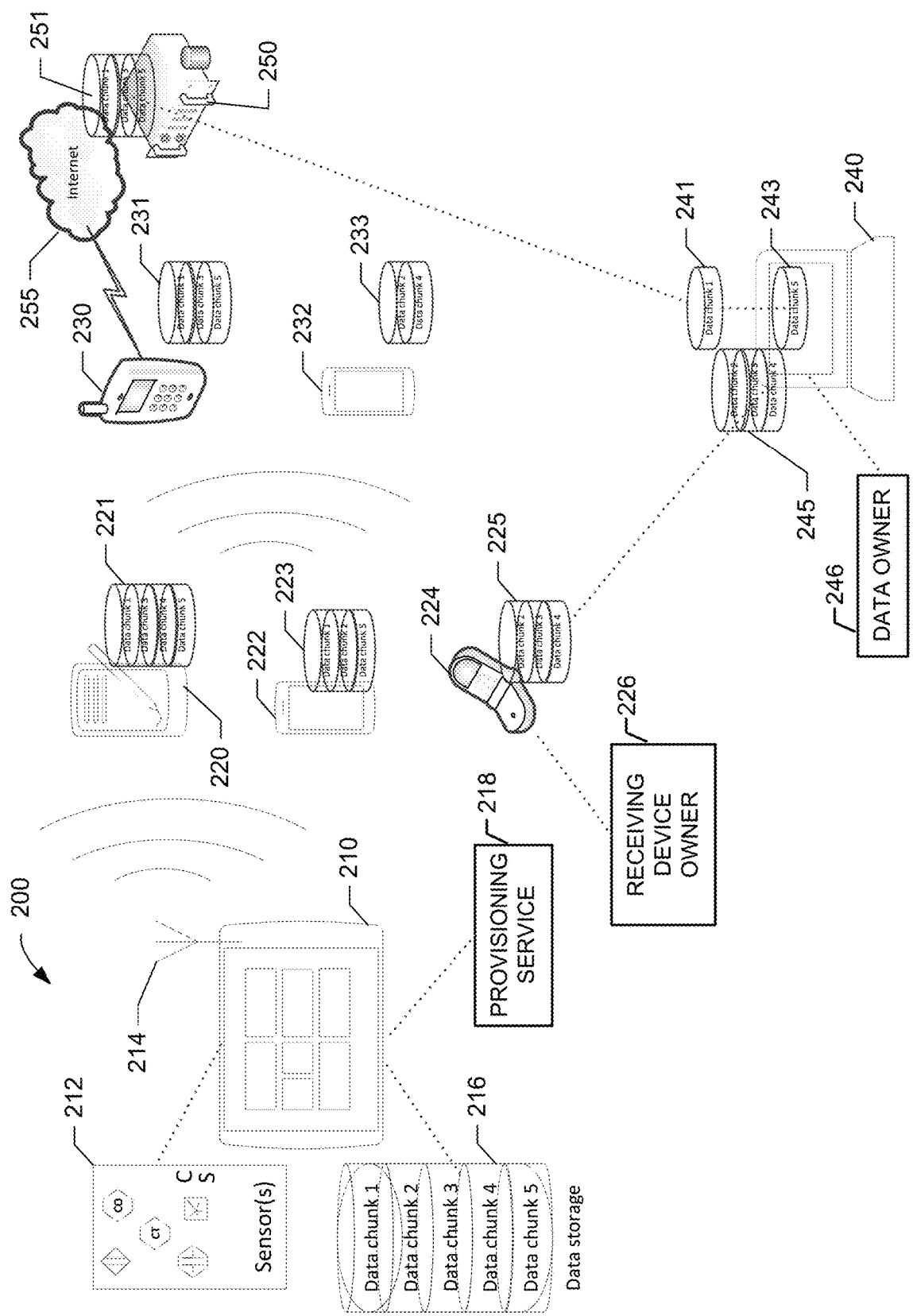
FIG. 2 is a schematic illustration of an example data storage and recovery system.

FIG. 2 is a schematic illustration of an example data storage and recovery system 200 improving electronic device operation and reliability through new technology for data transfer, backup, and recovery. The example system 200 includes a data producing device 210 (e.g., a device 102-110 and/or other source device 116 such as a cellular phone, laptop computer, tablet computer, power meter, flight recorder, etc.), also referred to as a data broadcasting device or a data providing device, which generates and/or gathers data from one or more attached and/or remote sensor(s) 212 (e.g., current sensors, voltage sensors, carbon monoxide sensors, etc.). The example data producing device 210 includes a communication interface 214 (e.g., WiFi™, BluetoothLE™, ZigBee™, near-field communication (NFC), cellular, etc.) to transmit and receive data and messages.

The example data producing device 210 also includes a storage 216. In certain examples, the device 210 stores its data in encrypted chunks to allow transfer to other devices without taking time to separate and/or encrypt the data at the time of transfer. In other examples, data can be stored in the data storage 216, and the device 210 can divide and encrypt the data into chunks before transferring the data to other devices. The later approach, however, may result in loss of valuable time if the device 210 is experiencing a failure. A number of chunks into which data is divided for storage and a replication factor (e.g., a desired number of copies of each chunk to store on remote nodes) depends on device characteristic, for example. In some examples, the replication factor is configured at device manufacture and/or setup of the device 210. In some examples, the replication factor can be dynamically adjusted based on an amount of data, number of nearby devices, etc. As described further below, the device 210 may communicate with a provisioning service 218 to generate an encryption key, provisioning certificate, etc., for distributed backup of data from the storage 216.

The example system 200 of FIG. 2 also includes one or more remote devices 220, 222, 224 (e.g., cellular phone, smart phone, tablet computer, etc.) within communication proximity (e.g., nodes within radio range) of the data producer device 210. Each of the remote devices 220, 222, 224 includes a designated storage space 221, 223, 225, respectively, for incoming (e.g., remote) data chunks from the device 210. The remote devices 220, 222, 224 are configured with an ability to "wake up" or activate (e.g., exit a sleep mode and resume an active mode, etc.) when triggered by an incoming data transfer, for example. In some examples, pre-defined environmental conditions, such as a triggering or "wake up" message, sensor data (e.g., detecting an abnormal value or condition, etc.), entering an emergency mode, etc., cause the remote device 220, 222, 224 to wake up or activate. In certain examples, the remote device 220, 222, 224 can advertise itself as a viable data vessel or backup device. In certain examples, a remote device owner 226 is alerted to the incoming data backed up by the remote device 224. In certain examples, one or more of the remote devices 220-224 can propagate (e.g., according to a routing algorithm, predefined rule, setting, etc.) incoming data chunks from the data producing device 210 to additional devices farther down a network from the data producing device 210 (e.g., nodes not directly accessible from the data producing device 210).

As shown in the example of FIG. 2, the system 200 also includes remote devices 230, 232 that are accessible via devices 220, 222, 224 but not directly from the producing device 210. Thus, remote devices 230, 232 are indirectly accessible by the data producing device 210 via one or more of the remote nodes 220, 222, 224. As with the remote devices 220, 222, 224, the remote devices 230, 232 include storage space 231, 233, respectively, to store incoming data chunks and can communicate with remote devices 220, 22, 224 to exchange data, for example.

Additionally, a data recovery device 240 is used to reassemble an original data stream from the data producing device 210 using data chunks stored by one or more remote devices 220-232. In some examples, duplicate data chunks may be stored with multiple remote devices 220-232, and the data recovery device 240 retrieves and combines the data chunks from various devices 220-232 to reconstitute the data (e.g., at the instruction of the data owner). In some examples, data chunk(s) 231 from the remote device 230 are provided to the data recovery device 240 by a networked storage device 250 (e.g., the data storage 140, etc.) including data 251 received from the remote device 230 via a network 255. The data recovery device 240 processes multiple data chunks 241, 243, 245 retrieved from a plurality of remote devices 220-232 and re-combines the data chunks 241, 243, 245 in order into a copy of the original data stream provided by the data producing device 210. Thus, a data owner 246 associated with the original data set 216 stored at the device 210 can authorize recreation of the data at the data recovery device 240. For example, the data recovery device 240 can reconstruct an original stream using a first data chunk 241 retrieved from the networked storage device 250, second, third and fourth data chunks 245 from remote device 224, and a fifth data chunk 243 from the network storage device 250. In certain examples, the data producing device 210 provides a manifest, list, or roadmap of the data chunks forming the original data stream. The manifest can be provided to the data owner 246, such as in conjunction with the data chunks via one or more of the remote devices 220, 222, 224, 230, 232, 250 and/or otherwise transmitted by the device 210 to the data owner 246 and/or the data recovery device 240 for reconstruction of the data chunks 241, 243, 245 into a copy of the original data from the data producing device 210.

Thus, the example system 200 allows a data producing device 210 and its data owner to leverage its surroundings (e.g., remote devices 220-232, etc.) to preserve its data and guard against a failure and/or destructive event with respect to the data producing device 210. In certain examples, pending authorization and/or authentication between sender (the data producing device 210) and receiver (one or more remote devices 220, 222, 224, 230, 232, 250), data is dispersed in one or more levels (e.g., from the data producing device 210 to proximate remote devices 220, 222 and/or 224 and then to out-of-range remote devices 230, 232 and/or 250). The data resides encrypted in remote device storage 221, 223, 225, 231, 233 and/or 251 until retrieved (e.g., by the data producing device 210, the data recovery device 240, and/or other data owner device). With proper attestation, the data producing device 210 can leverage its surroundings (e.g., other devices 220-224 within radio range and secondary devices 230-232 beyond) to preserve data (e.g., preserving the data stream of a "dying" or failing device 210).

In some examples, the receiving remote device(s) 220-250 may not even know the content of the data and/or the source of the data but can store encrypted data chunks 221-251 from a legitimized but anonymous source (e.g., the data producing device 210 authorized using an anonymous identification scheme such as an enhanced privacy identifier (EPID), etc.).

Figure 3A:
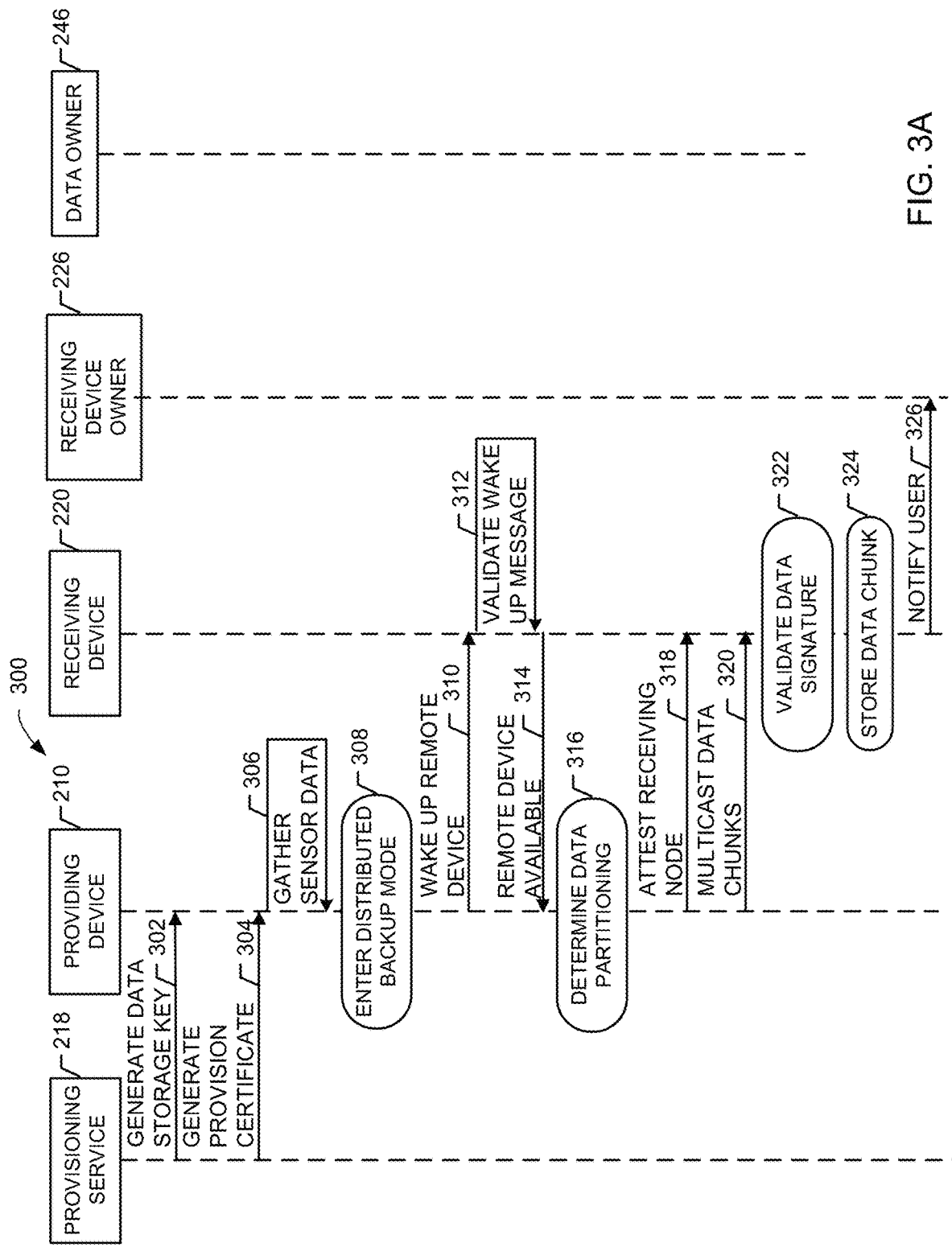
FIGS. 3A-3B depict a data flow diagram depicting an example exchange of messages and data between the data producing device and one or more remote devices.
Figure 3B:
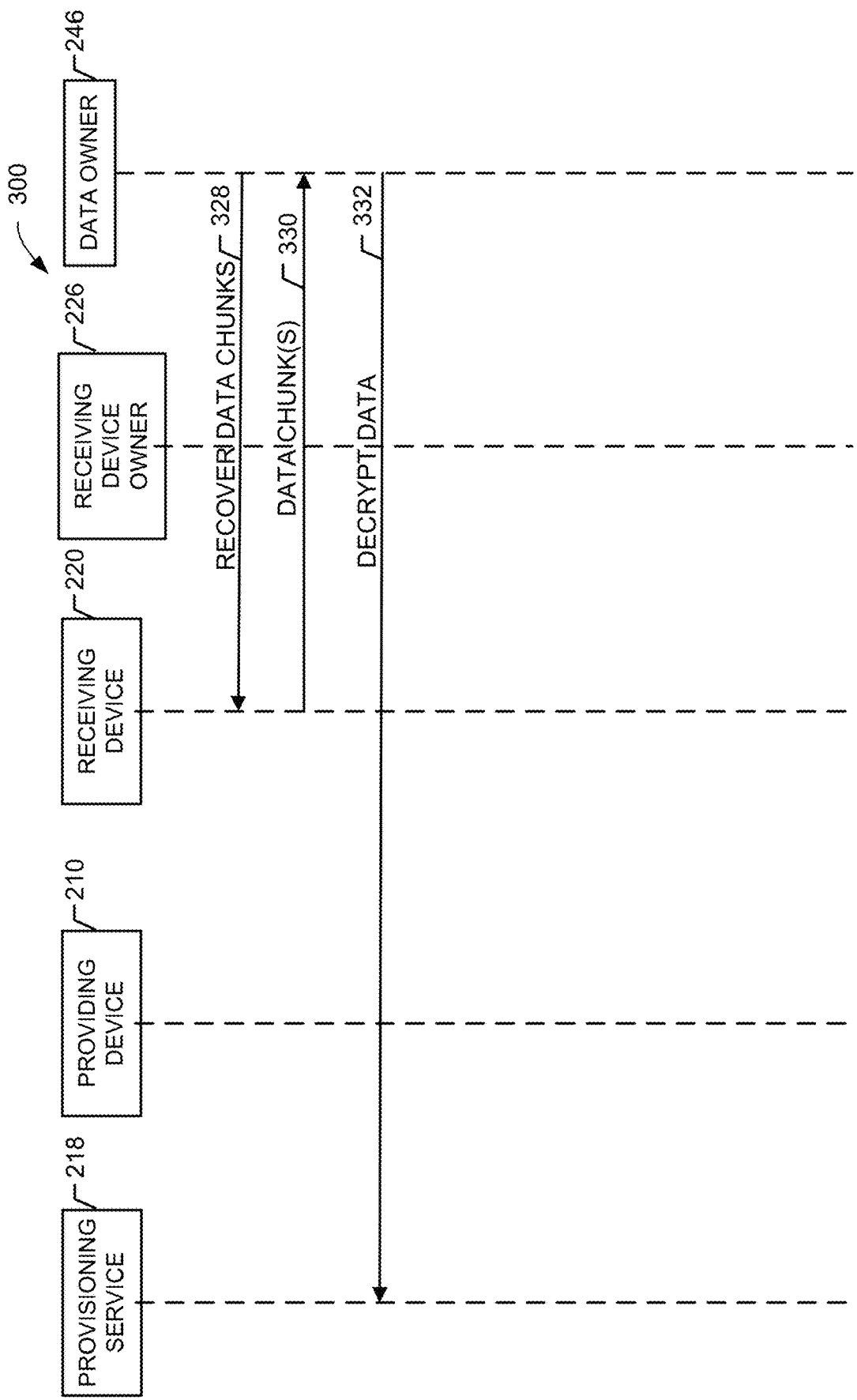

FIGS. 3A-3B depict a data flow diagram depicting an example exchange of messages and data 300 between the data producing device 210 and one or more remote devices 220-250 using the provisioning service 218, the receiving device owner 226, and the data owner 246.

As shown in the example of FIG. 3A, the data providing device 210 is provisioned by the provisioning service 218 (e.g., using Diffie-Hellman algorithm, etc.) with a key used to encrypt data. In certain examples, a symmetric cryptography algorithm, such as AES-256-GCM, is used for authenticated encryption of the data. In other examples, such as examples producing small data sets with more computing power, asymmetric cryptography (e.g., elliptic curve cryptography (ECC), etc.) can be used to encrypt the data. The key generated 302 for encryption is stored in a cryptographically secured container in both the device 210 (e.g., in a Trusted Platform Module (TPM) and in the provisioning server 218 (e.g., in an Intel® Software Guard Extensions (SGX) enclave for data transfer and/or storage). In some examples, device storage 221, 223, 225 may be unsecured when the encryption key is an asymmetric pair and only the public part of the encryption key is stored in the on-device storage.

In certain examples, provisioning by the provisioning service 218 occurs during device manufacturing (e.g., factory floor, secured/trusted environment, etc.) and/or at device setup in a target location. If provisioning occurs during device setup, the device 210 remotely authenticates itself as a legitimate, uncompromised data producing device 210 (e.g., using remote attestation protocols such as via a TPM module using a TCG DAA protocol and/or Intel's SGX remote attestation, etc.). The device 210 has a key that is able to confirm its identity as legitimate and uncompromised (e.g., a TPM Endorsement Key Certificate, a central processing unit (CPU) Fuse Key, etc.), for example.

For example, a CPU fuse key is a key that is "burned" in the CPU during its manufacture. The CPU fuse key is unique to that particular unit and cannot be changed. The CPU (and/or other processor) of the device 210 can then derive a key hierarchy using the fuse key as its root. The device manufacturer may not even know the key, as the device 210 can certify its key and prove it has access to the key without disclosing the key, for example.

Similarly, a TPM endorsement key is an encryption key that is permanently embedded in TPM) security hardware, typically at the time of manufacture. The TPM endorsement key is defined by the TCG. A private portion of the endorsement key is never released outside of the TPM. A public portion of the endorsement key helps to recognize a genuine TPM. TPM operations that involve signing pieces of data can use the endorsement key to allow other components to verify that the data can be trusted (e.g., a receiving device can trust data from the data providing device 210).

To sign a piece of data, for example, a public key is used to encrypt a small piece of information. The signature can be verified by using the corresponding private key to decrypt that same piece of data. If the data can be decrypted with the device's private key, then the data must have been encrypted by the corresponding public key. As long as that private key has been kept secret, the digital signature can be trusted.

In certain examples, the device 210 generates an authentication private key (e.g., an Elliptic Curve Digital Signature Algorithm (ECDSA) 192-bit private key, etc.) and certifies 304 the device's public part in the provisioning service 218 by sending a Certificate Signing Request (CSR) to the service 218. The provisioning service 218 can provision a certificate (304) (e.g., an x509-compatible certificate, etc.) for the device's public key using itself as a trusted Certificate Authority (CA) and/or can obtain a third party certificate which is signed by a trusted Certificate Authority, for example.

If embedding identifiable information about the device 210 is not desired, Enhanced Privacy ID (EPID)-based certificates and/or signatures can be used to preserve device 210 anonymity while maintaining a capability to authenticate the device 210 to remote nodes. Using an anonymous identifier, the device 210 can prove that it belongs to a group of authorized devices (e.g., an EPID group) but the verifying node is not able to identify the device 210 within the group. If an anonymous identifier is generated outside a trusted environment such as a factory floor, the device 210 may also prove its identity to a remote node such as by encrypting the CSR request using a shared symmetric key.

In normal operating conditions, the device 210 gathers data (e.g., sensor data, etc.) 306 and stores the data in encrypted form (e.g., using the storage key 302) in internal storage 216 for the device 210. The storage 216 is partitioned into N portions or "chunks" such as using a consistent hashing function for equal distribution. In certain examples, each chunk of storage is individually encrypted.

If the data producing device 210 determines that it is about to fail and/or operate under conditions of increased risk (e.g., inclement weather, high temperature, radiation, overclocking, etc.), then a distributed backup mode 308 is entered by the device 210. In the distributed backup mode 308 (also referred to as a "panic" mode or promiscuous mode), the data producing device 210 attempts to transmit (e.g., broadcast, multicast, and/or unicast) its data to other devices within communication range that are capable of storing and/or relaying the data from the device 210 (e.g., receiving devices 220, 22, 224).

As shown in the example of FIG. 3A, in the distributed backup mode 308, the device 210 transmits a "wake up" message 310 (e.g., a Wake on Wireless LAN (WoWLAN) packet, BluetoothLE™ advertisement, etc.) to the receiving device(s) 220. The wake up message 310 can include a certificate 304 (issued by a commonly trusted Certificate Authority) and a digital signature using a key corresponding to the certificate 304 which proves that the device 210 is in possession of a certified private key, for example.

In some examples, a remote wake up phase 310 is not included due to computational requirements (e.g., for battery-based receivers), possible threats (e.g., a Denial-of-Service attack vector, etc.), etc. Instead, the remote device 220 autonomously detects a critical condition and registers itself to the data transmitting or providing device 210 rather than being remotely triggered, for example.

In some examples, one or more auxiliary identification factors can be used for remote device 220 wake-up. For example, rather than having a smartphone's WLAN or Bluetooth always on and listening for a wakeup packet, the phone may enter a receiving mode if triggered by a text message from a carrier. While the text message trigger may still involve a remote node attestation phase for authorization, the text message from the carrier may help prevent some basic Denial-of-Service attacks since spoofing a cell carrier's tower, while possible, is costly and, therefore, not practical.

The remote device 220 receiving the wake up packet validates 312 that the request is legitimate. For example, the receiving device 220 verifies that the message 310 is properly signed and the issuer of the certificate is an allowed entity, such as a government signing authority, Verisign™, etc. If the wake up message 310 is deemed legitimate, the receiving device 220 enters and/or maintains a "normal" power state and responds to the providing device 210 that the receiving device 220 is available 314 and ready to accept data. The receiving device 220 can provide storage and network connectivity information in the availability message 314 and/or in an additional follow-up message, for example.

In some examples, if the designated write storage of the receiving device 220 is not empty, the receiving device 220 communicates an indication of criticality and/or importance associated with the data currently being stored in the designated storage space 221 of the receiving device 220. In some examples, data currently stored by the receiving device 220 can be overwritten by new data from the producing device 210 based on a comparison of criticality/importance associated with the old and new data (e.g., data produced by a car that took part in a collision can be superseded by data associated with a plane crashing, etc.).

In certain examples, rather than sending and receiving wake up 310 and availability 314 messages, the receiving device 220 can autonomously detect abnormal conditions (e.g., detecting a plane's rapid descent using built-in altitude sensors, identifying an impending storage failure at the data producing device 210 based on increasing hard drive write and/or read errors, determining a high likelihood of device 210 failure based on abnormal temperature readings from associated sensor(s) 212, detecting abnormal pressure readings, detecting abnormal noise levels, identifying freefall in the device 210, etc.). The receiving device 220 then sends the available message 314 without being remotely queried. In some examples, a user-initiated "emergency mode" can also trigger the backup mode 308 to distribute data from the device 210. In some examples, an emergency or panic mode can override normal restrictions on external and/or unsecure communications imposed on the device 210 and/or receiving device 220.

As depicted in the example of FIG. 3A, when the data producing device 210 receives an indication of receiving device 220 availability 314, data partitioning 316 is determined. For example, upon collecting 'receiver available' acknowledgements 314 from receiving device(s) 220, the data broadcaster 210 determines a target partitioning of the data based on one or more factors such as a desired replication factor, a number of receivers available, environment conditions (e.g., bandwidth, latency, transmission rate, estimated time to failure, etc.), etc. In certain examples, a number of receiving devices that are available to receive data from the producing device 210 is smaller than a number of chunks (N) into which the data is portioned into by the producing device 210, so that a partitioning scheme used by the data producing device 210 allocates data chunks to a group of receiver devices 220, 222, 224. Data chunks can be divided or partitioned among the group of available receiving devices 220, 222, 224 based on one or more factors including data size, available storage, data priority (e.g., mission-critical, important, low priority, etc.), available processing power, transmission bandwidth, input/output resources, etc.

The replication factor specifies how many copies of the same data chunks are provided to the group of receiving devices 220, 222, 224. Thus, N data chunks from the providing device 210 can become 2N or 3N to be distributed among the available receiving devices 220, 222, 224 depending on the specified replication factor (e.g., 1, 2, 3, etc.).

In certain examples, such as the example of FIG. 3A, in which data resiliency and/or security is a priority, a state attestation 318 can optionally be sent by the producing device 210 to the receiving device(s) 220 to determine receiving device state and characteristic(s) before sending data from the device 210 to the device(s) 220. For example, the data producing device 210 may confirm that the receiving device 220 is running an Intel® SGX-protected secure enclave before transmitting a data chunk to the receiving device 220. Additionally, information, such as a receiving device's cryptographically-secured "trust level", available storage, networking option(s), physical proximity, data criticality, etc., can be exchanged with the attestation 318. In some examples, receiving devices may not be treated equally for data distribution based on an analysis by the data producing device 210 of the characteristic(s) of each receiving device 220, 222, 224. For example, in case of an aircraft control processor, crew member cell phones may receive a full copy of the data but passenger cell phones may only receive certain chunks of data for security reasons. As another example, different devices 220, 222, 224 may receive different numbers of data chunks based on their available storage, networking capability, physical proximity, data criticality, etc. In some examples, data can simply be partitioned and divided equally among receiving devices.

Based on the determined partitioning 316 (and, optionally, attestation 318), data chunks are transmitted 320 (e.g., broadcast, multicast, unicast, etc.) from the data producing device 210 to one or more receiving devices 220 (and/or 222, 224, etc.). For example, the device 210 sends 320 encrypted data chunks to one or more recipient groups as determined by receiving device availability 314, data partitioning 316, and/or remote device attestation 318. In certain examples, a chunk header is appended to each transmitted data chunk to identify the data chunk and include additional information regarding the data chunk such as data importance/criticality, desired retention policy, propagation strategy, signature, etc. The data chunks are transmitted over the air to the desired recipient(s) using one or more communication techniques such as multicast communication, bootstrapping point-to-point channels with individual device(s) 220, etc. In some examples, communication channel information was provided by the receiving device 220 in the device availability message 314.

The receiving device 220 validates 322 a data signature for each received data chunk from the producing device 210. In certain examples, validation 322 also includes a check for revocation (e.g., of a key, signature, and/or group, etc.). In certain examples, if the receiving device's internal storage 221 is not empty, the receiving device 220 also assesses incoming data criticality/importance level and compares the criticality level with that of data already stored 221 by the receiving device 220. For example, the receiving device 220 evaluates policies for both incoming and existing data to rank the data in terms of priority for storage, redundancy, etc. That is, if a receiving device 220 has the only copy of a low priority data set and a high priority data chunk is incoming, the device 220 may still decide not to accept the incoming high priority data chunk if the high-priority data is already preserved at other device(s) 222, 224, for example. In some examples, the signing certificate authority can affect data priority (e.g., some certificate authorities are associated with a higher priority than other certificate authorities, etc.). Once validated (and accepted), the incoming data chunk(s) is/are stored 324 in memory 221 at the receiving device 220 (e.g., in non-volatile memory).

In certain examples, if requested (and/or permitted by the device 220 capabilities and settings), the encrypted data chunk can be further propagated to other nodes (e.g., transferred to remote devices 230, 232, uploaded to a cloud server 250, etc.). In some examples, due to time constraints, when the remote device 220 propagates a data chunk to a farther remote device 230, 232, the remote device 220 may not notify the data producing device 210 that the data has been forwarded to another remote device 230, 232. In other examples, the remote device 220 notifies the producing device 210 of the propagation and/or is instructed by the producing device 210 to propagate the data to another node 230, 232. In some examples, the data producing device 210 may specify a maximum number of hops for propagation of a data chunk, but the receiving device 220 determines a next destination 230, 232, 250 for the data chunk based on the constraint(s). Thus, the receiving device 220 acts as a "mission-critical device" upon receipt of the data chunk(s) from the producing device 210 and acts to preserve its data chunk(s) at one or more additional remote devices 230, 232, 250, for example. In certain examples, the data has a retention period after which it is deleted from the receiver node(s).

In some examples, the device 210 provides instruction to the receiving device 220 to act on and/or otherwise process the received data. For example, the receiving device 220 may sound a siren and/or other alarm, etc. The receiving device 220 may process the received data to trigger a message and/or other next action, for example.

Upon completing the data transfer (and, optionally, after a configurable delay), the owner/user 226 of the receiving device 220 is notified 326 that an encrypted payload is stored on the device 220. In some examples, the owner 226 can decide what to do with the data chunk. For example, the owner 226 can manually delete the payload from his or her device 220 and prohibit further data "dumps" from the same broadcaster node 210 by revoking (e.g., internally) the device's 210 provisioning certificate 304.

In other examples, instead of prompting the owner 226 to delete the data chunk, the owner 226 can offload the data to an external location, such as another remote device 222, 224, 230, 232, 250 and/or recovery device 240, etc. For critical data sets, the device 220 (e.g., a cell phone, tablet, etc.) may prohibit the user 226 from deleting the payload until the data has been transferred to another device 222, 224, 230, 232, uploaded to a remote cloud service 250 operated by the data owner 246, etc. In some such examples, the device 220 receives a confirmation of the successful transfer of the data before allowing the data to be deleted at the device 220.

In certain examples, a reward, incentive, or "bounty" may be provided for successfully delivering a data backup chunk to a legitimate data owner 246. If decryption and confirmation of the data chunk verifies that the data is valid and originated from a device 210 in distress, an incentive can be offered to the owner 226 of the receiving device 222, 224, 230, 232, 250. Thus, when non-affiliated consumer devices are used as recipients of the backup data, participation can be rewarded, for example.

As illustrated in the continued example data flow 300 shown in FIG. 3B, if the primary device 210 fails or is inaccessible, the data owner 246 triggers a recovery 328 of data chunks from the secondary nodes 220, 222, 224, 230, 232, 250 to assemble the full data stream (e.g., via the data recovery device 240, etc.) from the received data chunks 330. The data can then be decrypted 332 using original symmetric keys and recovered (e.g., partially or in full, depending on the number of chunks recovered) via the provisioning service 218 and/or by anyone having the data key which was establishing during provisioning by the provisioning service 218 and stored by another entity, for example.

Thus, as illustrated by the data flow 300 depicted in FIGS. 3A-3B, in an aircraft example, a ground collision alert triggers 308 a flight recorder to wake up (e.g., a WoWLAN call) all nearby user-held cell phones 310, partition the data set 316, and broadcast the partitioned data set in chunks to the receiver cell phone nodes 320, which accept the data stream 322, 324 because the data chunks are signed by a pre-authorized entity (e.g., an aircraft manufacturer, government authority, Verisign™, etc.). If the event triggering the ground collision alert is in fact catastrophic (e.g., the plane crashes) and the original flight recorder is damaged, the data can still be recoverable, provided that some cell phones are recovered from the crash scene 328, 330.

Thus, certain examples provide a remote-accessible storage enclave for emergency and/or other critical systems to preserve data in an event of a failure (e.g., a telecommunications failure, a programmable-logic circuit failure, an embedded device failure, a system on a chip (SoC) failure, an aerospace-related processor failure, an automotive and/or commuting-related processor failure, a home automation processor failure, etc.).

Figure 4:
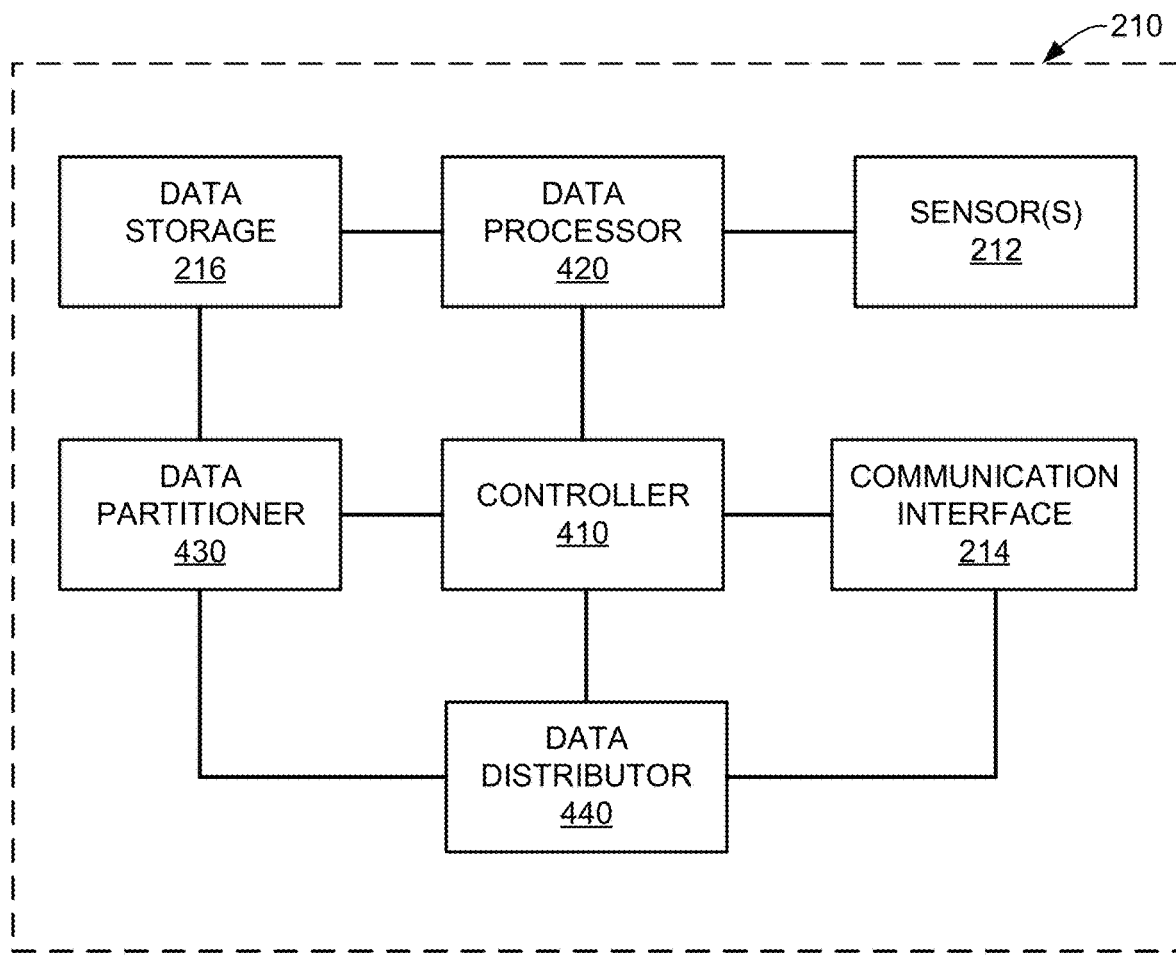
FIG. 4 illustrates an implementation of an example data producing device configured to facilitate distributed data storage and recovery.

FIG. 4 illustrates an implementation of the example data producing device 210 configured to facilitate distributed data storage and recovery. The example device 210 includes a controller 410, a data processor 420, a data partitioner 430, a data distributor 440, sensor(s) 212, the communication interface 214, and data storage 216.

The example controller 410 controls operation of the data producing device 210, including control of device 210 mode (e.g., an operating mode, a distributed backup mode, a data recovery mode, a failure mode, etc.). The controller 410 interacts with the provisioning service 218 to generate the data storage key 302, provisioning certificate 304, etc. The controller 410 works with the data processor 420 to facilitate organization and encryption of data gathered from the one or more sensors 212 based on the storage key 302 and provision certificate 304, for example. The controller 410 sets an operational mode for the device 210 (e.g., data gathering mode, distributed backup mode, failure mode, etc.).

The data processor 420 gathers data (e.g., sensor 212 data) for the device 210, analyzes the data to divide it into chunks, and encrypts the data chunks according to a storage key 302 (e.g., in the data gathering or normal operational mode). The data processor 420 stores the encrypted data chunks in the storage 216. The data processor 420 works with the provisioning service 218 to obtain a provisioning certificate 304 and organizes the data for storage on and off the device 210, for example.

Based on information from the device 210 and/or one or more of its sensors 212, the controller 410 triggers a change from a normal operational or data gathering mode to a data distribution or distributed backup mode 308. In the distributed backup mode 308, the controller 410 works with the communication interface 214 to wake up and/or otherwise contact 310 one or more remote receiving devices 220, 222, 224. Based on remote device availability 314, the controller 410 triggers the data partitioner 430 to organize the data chunks in storage 216 for distribution to one or more available receiving devices 220, 222, 224. The data distributor 440 transmits the organized data chunks to the one or more available receiving devices 220, 222, 224 via the communication interface 214.

While example implementations of the system 100, the system 200, the device 210, and the system data flow 300 are illustrated in FIGS. 1-4, one or more of the elements, processes and/or devices illustrated in FIGS. 1-4 may be combined, divided, re-arranged, omitted, eliminated and/or implemented in any other way. Further, the example data producing device 210, the example sensor(s) 212, the example communication interface 214, the example data storage 216, the example receiving devices 220-234, 250, the example provisioning service 218, the example controller 410, the example data processor 420, the example data partitioner 430, the example data distributor 440, and/or, more generally, the example systems 100, 200, and/or 300 of FIGS. 1-4, may be implemented by hardware, software, firmware and/or any combination of hardware, software and/or firmware. Thus, for example, any of the example data producing device 210, the example sensor(s) 212, the example communication interface 214, the example data storage 216, the example receiving devices 220-234, 250, the example provisioning service 218, the example controller 410, the example data processor 420, the example data partitioner 430, the example data distributor 440, and/or, more generally, the example systems 100, 200, and/or 300 of FIGS. 1-4 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data producing device 210, the example sensor(s) 212, the example communication interface 214, the example data storage 216, the example receiving devices 220-234, 250, the example provisioning service 218, the example controller 410, the example data processor 420, the example data partitioner 430, the example data distributor 440, and/or, more generally, the example systems 100, 200, and/or 300 of FIGS. 1-4 is/are hereby expressly defined to include a tangible computer readable storage device or storage disk such as a memory (e.g., a read only memory (ROM), hard drive, flash memory, other volatile and/or non-volatile memory, etc.), a digital versatile disk (DVD), a compact disk (CD), a Blu-ray disk, etc. storing the software and/or firmware. Further still, the example systems of FIGS. 1-4 may include one or more elements, processes and/or devices in addition to, or instead of, those illustrated in FIGS. 1-4, and/or may include more than one of any or all of the illustrated elements, processes and devices.

Flowcharts representative of example machine readable instructions for implementing the systems 100, 200, and/or 300 of FIGS. 1-4 are shown in FIGS. 5-8. In these examples, the machine readable instructions comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example programs are described with reference to the flowcharts illustrated in FIGS. 5-8, many other methods of implementing the example systems 100, 200, and/or 300 may alternatively be used. For example, the order of execution of the blocks may be changed, and/or some of the blocks described may be changed, eliminated, or combined.

As mentioned above, the example processes of FIGS. 5-8 may be implemented using coded instructions (e.g., computer and/or machine readable instructions) stored on a tangible computer readable storage medium such as a hard disk drive, a flash memory, a ROM, a CD, a DVD, a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 5:
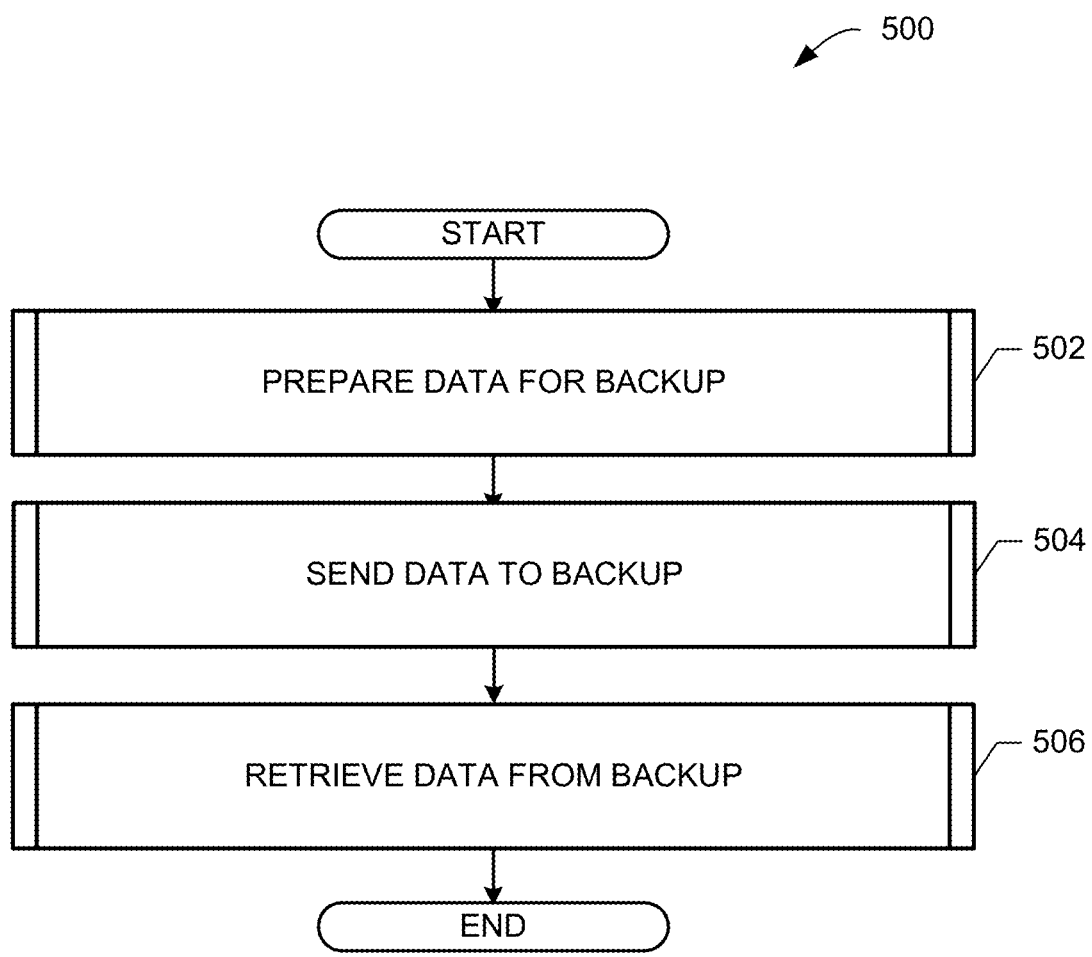
FIGS. 5-8 are flowcharts representative of example machine readable instructions that may be executed to implement the example systems of FIGS. 1-4.

The program 500 of FIG. 5 begins at block 502 at which the example controller 410 and the example data processor 420 prepare data gathered from one or more sensors 212 of the data producing device 210 for backup. As described above, sensor 212 data is gathered and processed by the data processor 420 to be encrypted and stored in data chunks in the data storage 216. Additionally, the controller 410 works with the provisioning service 218 to generate a data storage key 302 for the encryption and a provisioning certificate 304 to allow distributed backup or provisioning of the data in the storage 216 to one or more remote devices 220-234.

In response to preparing the data, the controller 410 works with the example data partitioner 430 and data distributor 440 to send the data for backup (block 504). As described above, the controller 410 communicates with one or more remote devices 220, 222, 224 via the communication interface 214 to determine available remote device(s) 220, 222, 224 able to receive data from the data producing device 210. Encrypted data chunks from the storage 216 are partitioned into various groups by the data partitioner 430 based on a number and capacity of available remote devices 220, 222, 224. The data distributor 440 transmits the partitioned data chunks via the communication interface 214 to the one or more available remote devices 220, 222, 224 for storage by the available remote device(s) 220, 222, 224 and/or relay to further remote device(s) 230, 232, 250 for storage.

At block 506, the data is retrieved from backup. As described above, the data owner 246 (e.g., via the example data recovery device 240) triggers a request to retrieve the data from the one or more receiving devices 220, 222, 224, 230, 232, 250 at which data chunks have been backed up. The data owner 246 may have a list of which device(s) store which data chunks (e.g., received directly from the data producing device 210, received in conjunction with the data from devices 220, 222, 224, 230, 232, and/or 250, etc.) and/or may broadcast a message triggering a response from those device(s) storing data associated with the data owner 246, for example. The receiving device(s) 220, 222, 224, 230, 232 and/or 250 storing the data provide their data chunks 330 to the data owner 246. The data owner 246 (e.g., via the data recovery device 240) decrypts the received data chunks 332 and reassembles (e.g., accounting for data redundancy according to the replication factor) the data chunks into a copy of the original data stream sent by the data producing device 210.

Figure 6:
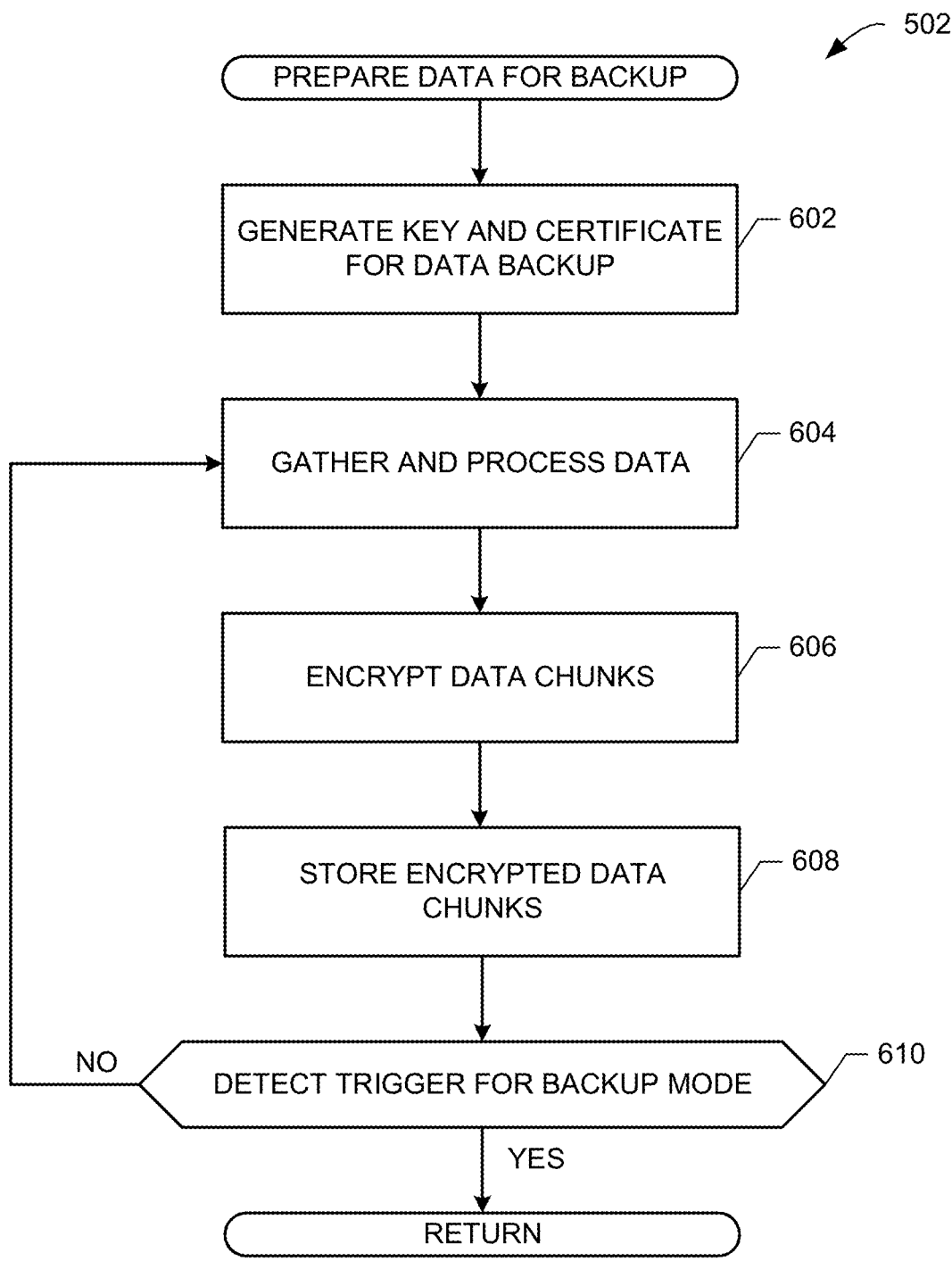

Additional detail associated with the preparing data for backup (block 502) is shown in the example of FIG. 6. At block 602 in the illustrated example of FIG. 6, the example controller 410 of the example data producing device 210 prepares for backup of collected data by generating an encryption key to encrypt stored data and generate a certificate of authorization to provision or distribute one or more copies of the data for backup, for example.

At block 604, the example data processor 420 gathers data from the example sensor(s) 212 of the device 210. For example, performance data, operational data, environment data, etc., can be measured by the sensor(s) 212, and the data processor 420 gathers the data for processing and storage. For example, the data processor 420 processes the gathered data to divide the data into data chunks for ease of storage and distribution.

At block 606, the data is encrypted by the data processor 420. At block 608, the encrypted data chunks are stored. For example, use the key provided by the controller 410, the data processor 420 encrypts the data chunks and stores them in the example data storage 216.

For example, as described above, the data producing device 210 may not want to send sensitive data to a receiving device 220, 222, 224 that may try to read the data. The controller 410 and/or data processor 420 encrypts the data and stores the data encrypted. The controller 410 establishes a key with the owner of the data (e.g., the provisioning service 218), and the controller 410 and data owner 246 share that key. The data processor 420 processes and divides the data to be properly encrypted and decrypted (e.g., stored in chunks such as in a Hadoop Distributed File System (HDFS) with each of the chunks being individually encrypted, etc.). The data chunks may not be usable on their own, but metadata, tags and/or other identifying/instructional information allow the data owner 246 to re-connect the disparate data chunks into the original data stream, for example.

At block 610, sensor and/or activity data is monitored by the controller 410 to detect a trigger event for the distributed backup mode 308. For example, the distributed backup mode 308 can be triggered by one or more factors such as passage of time (e.g., a periodic interval for data backup, etc.), sensor data exceeding a threshold (e.g., measuring greater than a certain temperature, velocity, rate of descent, pressure, moisture, radiation, etc.; measuring less than a certain temperature, power, pressure, bandwidth, etc.), available communication capability, proximity to other compatible receiving device(s), etc.

Figure 7:
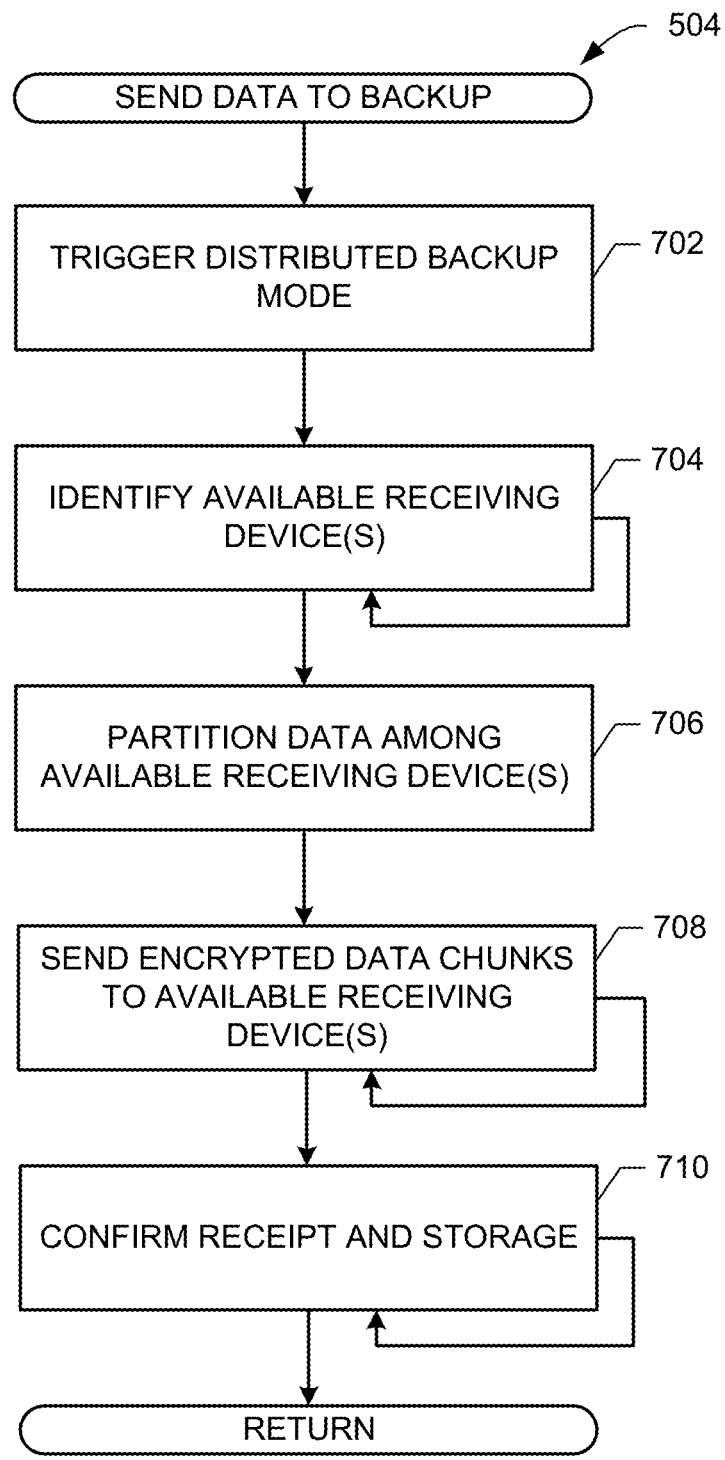

Additional detail associated with sending data to backup (block 504) is shown in FIG. 7. At block 702 in the illustrated example of FIG. 7, the example controller 410 triggers the distributed backup mode 308 based on detection of a trigger event (see, e.g., block 610 of the example of FIG. 6 above). In the distributed backup mode 308, the controller 410 uses the encryption key 302 and provisioning certificate 304 to distribute the data for backup.

At block 704, the controller 410 identifies one or more available receiving devices 220, 222, 224 for distribution of the data for backup. For example, the controller 410 communicates with one or more remote devices 220, 222, 224 via the communication interface 214 to determine available remote device(s) 220, 222, 224 able to receive data from the data producing device 210. Receiving devices 220, 222 and/or 224 can communicate by validating 312 a wake up and/or status message 310 sent by the data producing device 210 and responding 314 to the device 210 that the particular remote device 220, 222, 224 is available for data storage.

In certain examples, devices 210, 220, 222, and/or 224 communicate via a mesh network, point-to-point communication, and/or other communication protocol and can be triggered by the wake-up message 310, detection by the receiving device(s) 220, 222, 224 of an environmental condition indicating distress of the data producing device 210, and/or other external trigger such as a prompt by a cellular carrier to cellular phones within communication range of the data producing device 210. In some examples, the distributed backup mode 308 is periodically triggered, regardless of environmental factors, and receiving device(s) 220, 222, 224 periodically "wake up" or await communication from the producing device 210 to receive some or all of its data. In certain examples, power consumption concerns are balanced with data reliability concerns to conserve power at the receiving device 220, 222, 224 but provide data backup and redundancy for the producing device 210.

At block 706, data (e.g., encrypted data chunks) stored in data storage 216 at the example data producing device 210 is partitioned by the example data partitioner 430 for distributed backup among available receiving device(s) 220, 222, 224. In certain examples, the data partitioner 430 divides the data chunks into groups based on the number (and/or capacity) of available receiving device(s) 220, 222, 224 such that no single receiving device 220, 222, 224 receives a complete copy of the data. Additionally, the data partitioner 430 may provide redundant copies of one or more data chunks according to a redundancy or replication factor or parameter, for example.

At block 708, the data distributor 440 transmits the partitioned data chunks via the communication interface 214 to the one or more available remote devices 220, 222, 224 for storage by the available remote device(s) 220, 222, 224 and/or relay to further remote device(s) 230, 232, 250 for storage. Storage and/or further relay can be specified by the controller 410 in a header, manifest, and/or other instruction transmitted with the data chunks, for example.

In certain examples, the data producing device 210 attests to its authenticity before transmitting the data to the receiving device 220, 222, 224. For example, the data producer 210 authenticates to potential receiving devices (e.g., using x509 certificates, etc.) that it has a valid certificate 304 issued by an entity that is commonly trusted (and is, therefore, a valid sender of the data). The private key 302 can also be used to show that the producing device 210 is the owner of the data.

In some examples, rather than establishing trust between producing device 210 and receiving device(s) 220, 222, 224, an EPID and/or other anonymized identifier can show the receiving device 220, 222, 224 that the producing device 210 is a legitimate source of data (and that data is important to backup, for example). Thus, for example, in a power plant scenario in which a reactor is about to melt down, a bystander does not need to know which reactor is going to fail. The bystander's smartphone just needs to know that a legitimate device is sending it an encrypted chunk of data for storage. Similarly, one or more receiving devices 220, 222, 224 may wish to remain anonymous while authorizing themselves to the producing device 210 and providing evidence of membership in a group of valid devices 220, 222, 224 to receive the data from the producing device 210 (e.g., via an EPID, other anonymized identifier, etc.).

In some examples, the receiving device 220, 222, 224 can also be queried or challenged for its attestation. If the data is to be secure, for example, the controller 410 may ask the receiving device 220, 222, 224 to attest that it is running an enclave to secure the data (e.g., prove the hardware storage of the receiving device is a sandbox isolated from the rest of the operating system on the receiving device, etc.). The producer 210 receives attestation responses from the potential receiver(s) 220, 222, 224 and establishes communication channels (e.g., via the communication interface 214) with those device(s) 220, 222, 224 that respond in a given time window. Data is then sent by the example data distributor 440 over the communication channels to the one or more verified, available receiving devices 220, 222, 224, for example. Data can be sent in full copy, one or more data chunks, redundant data chunks sent to multiple nodes, etc.

At block 710, the controller 410 of the data producing device 210 confirms receipt, storage, and/or forwarding of the data by the one or more receiving devices 220, 222, 224. For example, each receiving device 220, 222, 224 acknowledges receipt to the producing device 210. If the receiving device 220, 222, 224 has relayed and/or further replicated the data to one or more secondary receiving device(s) 230, 232, 240, then an acknowledgement of the forward can be provided to the producing device 210, for example.

In some examples, the data can be accompanied by a manifest, header, and/or other instruction to tell the receiving device 220, 222, 224, 230, 232, 250 how to store the data, how to manage the data, and/or how to propagate the data, etc. The instruction may include a retention policy telling the receiving device how long to store the data, for example. In some examples, the retention policy specifies that the receiving device 220-250 cannot delete the data unless it can relay the data to another receiving device 220-250. The instruction can provide a priority and/or reliability level showing importance, trust, etc., for the data. While in some examples, the receiving device 220-250 does not understand the encrypted data chunk(s) it receives for storage, in other examples, non-sensitive data can be processed by the receiving device such as to help the receiving device 220-250 generate a warning and/or other alert of device 210 failure, for example. In some examples, an owner 226 of the receiving device 220-250 receives an indication that data has been stored on the device 220-250 by the data producing device 210.

Figure 8:
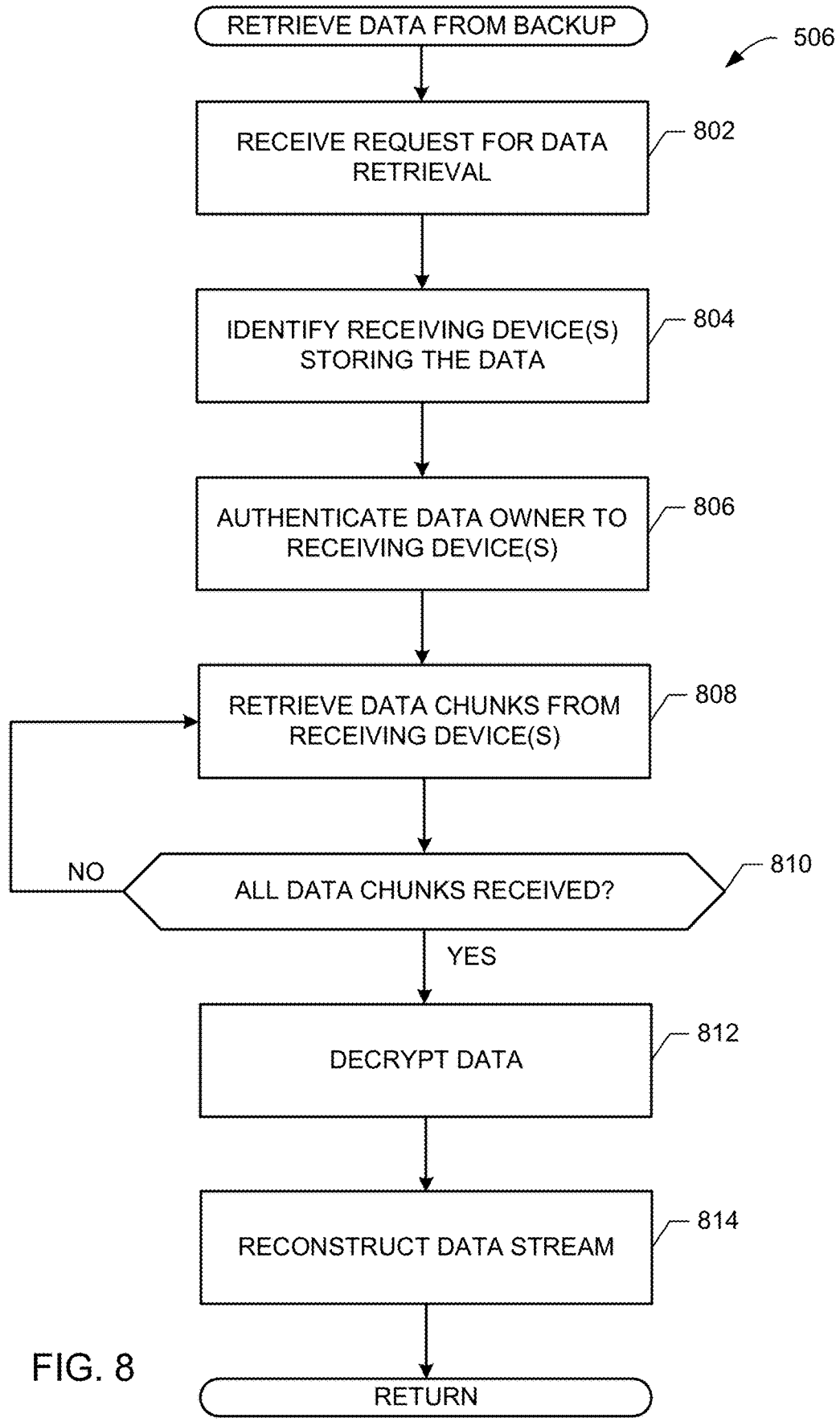

Additional detail associated with retrieving data from backup (block 506) is shown in FIG. 8. At block 802 in the illustrated example of FIG. 8, a request for data retrieval is received from the data owner 246. For example, as described above, the data owner 246 uses the example data recovery device 240 to trigger 328 a recovery of the backed up data from the receiving device(s) 220-250.

At block 804, the receiving device(s) 220, 222, 224, 230, 232, 240 storing data chunks of the backed up data are identified. For example, the data recovery device 240 uses a manifest and/or list of data chunks and associated receiving device(s) 220-250 to which the data chunks were sent to identify receiving device(s) 220-250 for data retrieval. In some examples, the data recovery device 240 broadcasts a message triggering a response from those device(s) 220, 222, 224, 230, 232, 240 storing data associated with the data owner 246.

At block 806, the data owner 246 is authenticated to the identified receiving device(s) 220-250. For example, an authentication certificate, key, signature, anonymized identifier, etc., is provided by the data recovery device 240 to each receiving device 220-250 to verify that the data owner 246 requesting the retrieval matches the data owner 246 who provided the data for distributed backup.

At block 808, the data recovery device 240 receives data chunks from the identified receiving device(s) 220-250. For example, the receiving device(s) 220, 222, 224, 230, 232 and/or 250 storing the data provide their data chunks 330 to the data owner 246 via the data recovery device 240. In some examples, the data chunks are pushed to the data recovery device 240 by the receiving device(s) 220-250. In some examples, the data recovery device 240 pulls the stored data blocks from the receiving device(s) 220-250 by request.

At block 810, the incoming data chunks are processed to determine whether all data chunks representing the original backed up data stream have been received. For example, the data recovery device 240 can process a manifest or list of the data chunks to confirm that all backup data chunks have been received (e.g., discounting, discarding, and/or eliminating redundant data chunks, etc.). In some examples, data chunks are numbered sequentially (e.g., one million data chunks numbered 1 to 1,000,000, one million data chunks duplicated into two million data chunks and dividing among twenty receiving devices, etc.) to enable the data chunks to be identified and reconstructed in order. Thus, a number of data chunks, a number of receiving devices, and a replication factor can enable the data recovery device 240 to identify and retrieve the data chunks from their backup receiving devices 220-250 and confirm successful retrieval of all chunks, for example. If data chunk(s) remain to be received, control reverts to block 808 to continue receiving data chunk(s) from receiving device(s) 220-250 and ping the receiving device(s) to prompt transmission, etc.

At block 812, if all data chunks have been received, the data recovery device 240 decrypts the data chunks (e.g., using the private key 302 associated with the data owner 246, etc.). At block 814, the data recovery device 240 reconstructs a copy of the original data from the decrypted series of data chunks. For example, based on data chunk numbering/order and redundancy information, the data recovery device 240 orders (e.g., accounting for data redundancy according to the replication factor, etc.) the decrypted data chunks to reproduce the original data stream sent by the data producing device 210.

Thus, data can be saved in distributed backup from a data producing device 210 to a plurality of receiving devices 220, 222, 224, 230, 232, 240 and reconstructed by the data owner 246 via a data recovery device 240 according to a distribution and retrieval policy. In some examples, if the data producing device 210 continues to operate, backed up data chunks can be overwritten by updated and/or otherwise new data chunks. In some examples, receiving device(s) 220-232, 240 can automatically delete stored data chunks after passage of a specified period of time (e.g., if device 210 failure does not occur within a certain period of time, if a request for data retrieval does not occur within a certain period of time, etc.). In some examples, data (e.g., critical and/or other important data, etc.) cannot be deleted without permission from and/or recovery by the data owner 246.

Figure 9:
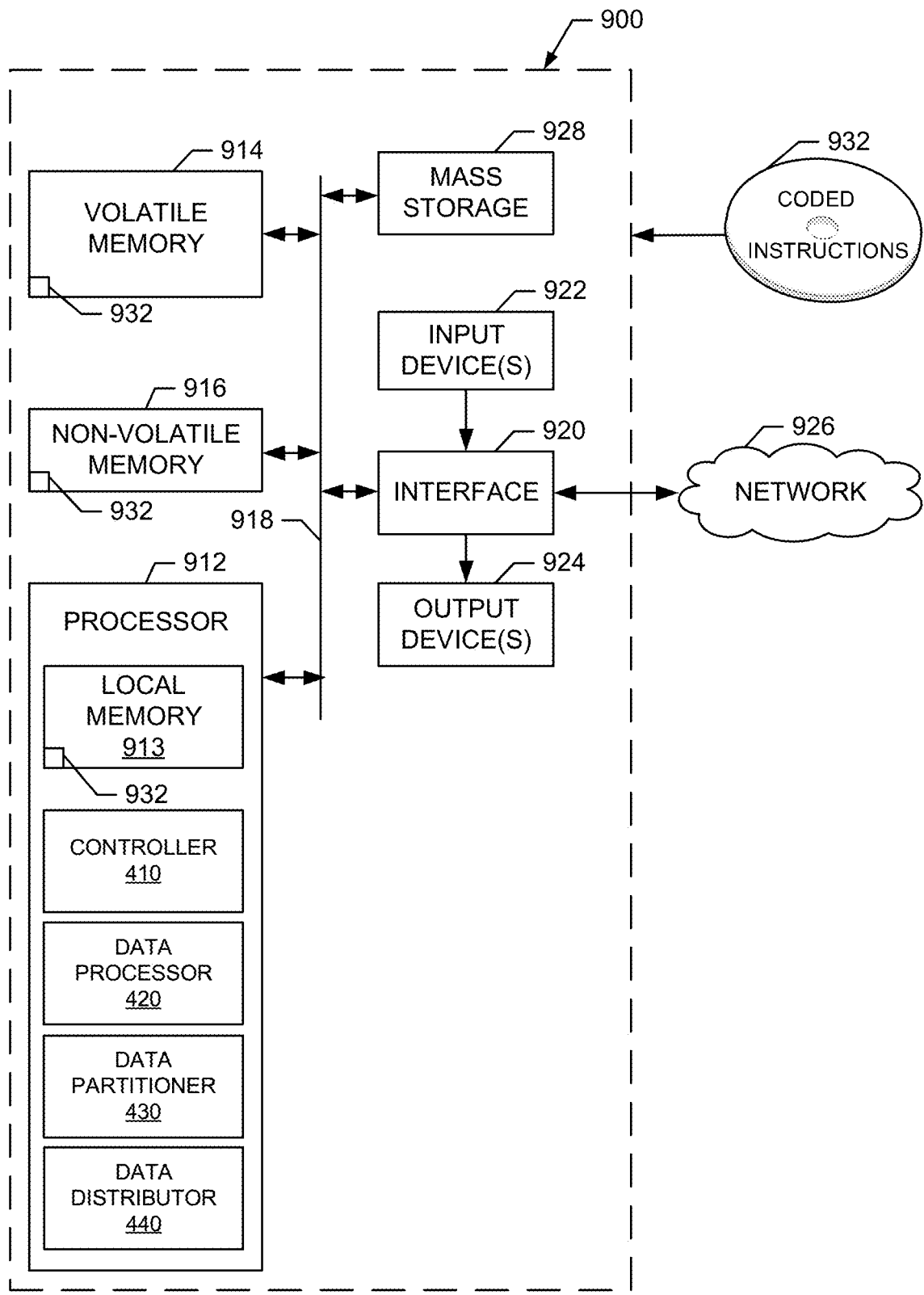
FIG. 9 is a schematic illustration of an example processor platform that may execute the instructions of FIGS. 5-8 to implement the example systems of FIGS. 1-4.

FIG. 9 is a block diagram of an example processor platform 900 capable of executing the instructions of FIGS. 5-8 to implement the systems of FIGS. 1-4. The processor platform 900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. In the illustrated example, the processor 912 is structured to include the example controller 410, the example data processor 420, the example data partitioner 430, and the example data distributor 440 of the example data producing device 210.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a peripheral component interconnect (PCI) express interface.

In the illustrated example, one or more input devices 922 are connected to the interface circuit 920. The input device(s) 922 permit(s) a user to enter data and commands into the processor 912. The input device(s) 922 can be implemented by, for example, an audio sensor, a microphone, a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 5-8 may be stored in the mass storage device 928, in the volatile memory 914, in the non-volatile memory 916, and/or on a removable tangible computer readable storage medium such as a CD or DVD.

From the foregoing, it will be appreciated that the above disclosed methods, apparatus and articles of manufacture facilitate data backup and restoration in IoT and/or other electronic devices by providing situational awareness and communication protocols to gather data, trigger a distributed backup mode, identify available receiving device(s), distribute data among qualifying receiving device(s), and reconstruct the distributed data from the receiving device(s) by a data owner. Examples disclosed herein facilitate data security and reliability through redundant, encrypted distribution of data for backup among devices within communication range of the source device and secure, authenticated restoration of such data by the data owner. Such examples preserve confidentiality and integrity of the backed up data.

Examples disclosed herein provide a distributed black box or IoT data vault for recording and recreating a data stream. Examples disclosed herein provide an emergency data vault for failing devices seeking secure distributed storage for data. Examples disclosed herein provide retrievable, distributed data storage in secure enclaves. Examples disclosed herein form an ad hoc backup mesh/network including one or more layers or levels of redundant storage (e.g., secondary devices, tertiary devices, etc., receiving data from a source device) to provide secure, authenticated preservation of a data stream.

Example 1 is an apparatus to manage distributed data backup including a controller to detect a trigger event for a distributed backup mode; and, in response to detection of the trigger event, trigger the distributed backup mode. When in the distributed backup mode, the controller of example 1 is to identify one or more receiving devices within communication range of the apparatus available to receive a data backup from the apparatus. Example 1 includes a data distributor to distribute data from the apparatus among the one or more receiving devices. The controller of example 1 is to confirm receipt of the distributed data by the one or more receiving devices.

Example 2 includes the subject matter of example 1, wherein the controller is to establish a key for encryption of the data.

Example 3 includes the subject matter of example 2, further including a data processor to divide the data into data chunks and encrypt the data chunks according to the key from the controller.

Example 4 includes the subject matter of example 1, wherein the controller is to obtain a provisioning certificate from a provisioning service to distribute the data to the one or more receiving devices.

Example 5 includes the subject matter of example 1, further including a data partitioner to distribute the data in a first plurality of data chunks to the one or more receiving devices.

Example 6 includes the subject matter of example 5, wherein the data partitioner duplicates the first plurality of data chunks to form at least a second plurality of data chunks according to a replication factor and distributes the first plurality of data chunks to a first subset of receiving devices and the second plurality of data chunks to a second subset of receiving devices.

Example 7 includes the subject matter of example 1, wherein the controller is to provide instructions with the data to the one or more receiving devices, the instructions instructing at least one of the one or more receiving devices to forward the data to a secondary receiving device.

Example 8 includes the subject matter of example 1, wherein the controller is to transmit a wake up message to the one or more receiving devices.

Example 9 includes the subject matter of example 1, wherein the controller is to generate an attestation of authenticity of the apparatus to the one or more receiving devices.

Example 10 includes the subject matter of example 1, wherein the controller is to receive a validation from each of the one or more receiving devices.

Example 11 includes the subject matter of example 1, wherein the controller is to generate a manifest indicating an order of a plurality of data chunks forming a data stream from the apparatus.

Example 12 includes the subject matter of example 11, wherein the controller is to provide the manifest to a data recovery device, the data recovery device to use the manifest to reconstruct the data stream from the data distributed to the one or more receiving devices.

Example 13 includes a method to manage distributed data backup, including detecting a trigger event for a distributed backup mode; in response to detection of the trigger event, triggering the distributed backup mode at a data producing device; when in the distributed backup mode, identifying one or more receiving devices within communication range of the data producing device available to receive a data backup from the data producing device; distributing data from the data producing device among the one or more receiving devices; and confirming receipt of the distributed data by the one or more receiving devices.

Example 14 includes the subject matter of example 13, further including establishing a key for encryption of the data.

Example 15 includes the subject matter of example 14, further including dividing the data into data chunks; and encrypting the data chunks according to the key.

Example 16 includes the subject matter of example 13, further including obtaining a provisioning certificate from a provisioning service to distribute the data to the one or more receiving devices.

Example 17 includes the subject matter of example 13, further including distributing the data in a first plurality of data chunks to the one or more receiving devices.

Example 18 includes the subject matter of example 17, further including duplicating the first plurality of data chunks to form at least a second plurality of data chunks according to a replication factor; and distributing the first plurality of data chunks to a first subset of receiving devices and the second plurality of data chunks to a second subset of receiving devices.

Example 19 includes the subject matter of example 13, further including providing instructions with the data to the one or more receiving devices, the instructions instructing at least one of the one or more receiving devices to forward the data to a secondary receiving device.

Example 20 includes the subject matter of example 13, further including transmitting a wake up message to the one or more receiving devices.

Example 21 includes the subject matter of example 13, further including generating an attestation of authenticity of the apparatus to the one or more receiving devices.

Example 22 includes the subject matter of example 13, further including receiving a validation from each of the one or more receiving devices.

Example 23 includes the subject matter of example 13, further including generating a manifest indicating an order of a plurality of data chunks forming a data stream from the data producing apparatus.

Example 24 includes the subject matter of example 23, further including providing the manifest to a data recovery device, the data recovery device to use the manifest to reconstruct the data stream from the data distributed to the one or more receiving devices.

Example 25 includes the subject matter of example 13, wherein the one or more receiving devices include one or more secondary receiving devices, and wherein the one or more secondary receiving devices relay the data from the producing device to one or more tertiary receiving devices.

Example 26 includes a tangible computer readable storage medium including computer readable instructions which, when executed, cause a processor to at least detect a trigger event for a distributed backup mode; in response to detection of the trigger event, trigger the distributed backup mode at a data producing device; when in the distributed backup mode, identify one or more receiving devices within communication range of the data producing device available to receive a data backup from the data producing device; distribute data from the data producing device among the one or more receiving devices; and confirm receipt of the distributed data by the one or more receiving devices.

Example 27 includes the subject matter of example 26, wherein the instructions, when executed, cause the processor to establish a key for encryption of the data.

Example 28 includes the subject matter of example 26, wherein the instructions, when executed, cause the processor to divide the data into data chunks and encrypt the data chunks according to the key.

Example 29 includes the subject matter of example 26, wherein the instructions, when executed, cause the processor to obtain a provisioning certificate from a provisioning service to distribute the data to the one or more receiving devices.

Example 30 includes the subject matter of example 26, wherein the instructions, when executed, cause the processor to distribute the data in a first plurality of data chunks to the one or more receiving devices.

Example 31 includes the subject matter of example 30, wherein the instructions, when executed, cause the processor to duplicate the first plurality of data chunks to form at least a second plurality of data chunks according to a replication factor and distribute the first plurality of data chunks to a first subset of receiving devices and the second plurality of data chunks to a second subset of receiving devices.

Example 32 includes the subject matter of example 26, wherein the instructions, when executed, cause the processor to provide instructions with the data to the one or more receiving devices, the instructions instructing at least one of the one or more receiving devices to forward the data to a secondary receiving device.

Example 33 includes the subject matter of example 26, wherein the instructions, when executed, cause the processor to transmit a wake up message to the one or more receiving devices.

Example 34 includes the subject matter of example 26, wherein the instructions, when executed, cause the processor to generate an attestation of authenticity of the apparatus to the one or more receiving devices.

Example 35 includes the subject matter of example 26, wherein the instructions, when executed, cause the processor to receive a validation from each of the one or more receiving devices.

Example 36 includes the subject matter of example 26, wherein the instructions, when executed, cause the processor to generate a manifest indicating an order of a plurality of data chunks forming a data stream from the data producing apparatus.

Example 37 includes the subject matter of example 36, wherein the instructions, when executed, cause the processor to provide the manifest to a data recovery device, the data recovery device to use the manifest to reconstruct the data stream from the data distributed to the one or more receiving devices.

Example 38 includes an apparatus to recover data from a failed device, the system including a processor configured to: identify, based on a request for data retrieval, one or more receiving devices storing the data; authenticate a data owner to the one or more receiving devices; retrieving data chunks from the one or more receiving devices; decrypting the data chunks; and reconstructing a data stream from the decrypted data chunks.

Example 39 includes a system to manage distributed data backup including means for detecting a trigger event for a distributed backup mode and triggering the distributed backup mode; means for identifying one or more receiving devices within communication range of the system available to receive a data backup from the system; and means for distributing data from the apparatus among the one or more receiving devices.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A recovery apparatus comprising:
memory including instructions; and
processor circuitry to execute the instructions to at least:
identify, using a manifest, a plurality of devices storing portions of data representing a backup of a first data set of a data owner, the manifest mapping the portions of data to the plurality of devices to facilitate retrieval;
authenticate the data owner to the plurality of devices;
process the manifest to confirm receipt of the portions of data corresponding to the first data set from the plurality of devices, the process including accounting for redundancy among the portions of data from the plurality of devices; and
reconstruct a second data set that is a copy of the first data set from the portions of data according to the manifest.

2. The recovery apparatus of claim 1, wherein the processor circuitry is to decrypt the portions of data.

3. The recovery apparatus of claim 1, wherein the processor circuitry is to reconstruct a data stream from the portions of data.

4. The recovery apparatus of claim 1, wherein the processor circuitry is to account for redundancy by identifying and removing redundant data from the portions of data as specified in the manifest to reconstruct the copy of the first data set from the portions of data.

5. The recovery apparatus of claim 1, wherein the processor circuitry is to recover the portions of data to reconstruct the copy of the first data set according to a distribution and retrieval policy.

6. The recovery apparatus of claim 1, wherein the processor circuitry is to overwrite a first portion of the portions of data with a second portion of the portions of data to reconstruct the copy of the first data set.

7. The recovery apparatus of claim 1, wherein the plurality of devices includes at least a first device having a first portion of data and a second device having a second portion of data.

8. The recovery apparatus of claim 7, wherein the second portion of data is redundant of the first portion of data.

9. The recovery apparatus of claim 1, wherein the plurality of devices are triggered to provide their respective portions of data in response to a request for data retrieval.

10. The recovery apparatus of claim 1, wherein the portions of data include a first portion and a second portion, the second portion an update of the first portion, and wherein the processor circuitry is to reconstruct the second data set using the second portion rather than the first portion.

11. A computer readable storage medium comprising instructions that, when executed by at least one processor, cause the at least one processor to:
identify, using a manifest, a plurality of devices storing portions of data representing a backup of a first data set of a data owner, the manifest mapping the portions of data to the plurality of devices to facilitate retrieval;
authenticate the data owner to the plurality of devices;
process the manifest to confirm the portions of data corresponding to the first data set from the plurality of devices, the process including resolving redundancy among the portions of data from the plurality of devices; and
reconstruct a second data set that is a copy of the first data set from the portions of data according to the manifest.

12. The computer readable storage medium of claim 11, wherein the instructions, when executed, cause the at least one processor to decrypt the portions of data.

13. The computer readable storage medium of claim 11, wherein the instructions, when executed, cause the at least one processor to reconstruct a data stream from the portions of data.

14. The computer readable storage medium of claim 11, wherein the instructions, when executed, cause the at least one processor to process the portions with respect to the manifest to determine whether all portions of data representing the backup associated with the first data set have been received.

15. The computer readable storage medium of claim 11, wherein the instructions, when executed, cause the at least one processor to identify and remove redundant data from the portions of data to reconstruct the copy of the first data set from the portions of data.

16. The computer readable storage medium of claim 11, wherein the instructions, when executed, cause the at least one processor to recover the portions of data to reconstruct the copy of the first data set according to a distribution and retrieval policy.

17. A method to recover a distributed data backup, the method comprising:
identifying, using a manifest by executing an instruction using a processor, a plurality of devices storing portions of data representing a backup of a first data set of a data owner, the manifest mapping the portions of data to the plurality of devices to facilitate retrieval;
authenticating, by executing an instruction using the processor, the data owner to the plurality of devices;
processing the manifest to confirm receipt of the portions of data corresponding to the first data set from the plurality of devices, the process including resolving redundancy among the portions of data from the plurality of devices; and
reconstructing, by executing an instruction using the processor, a second data set that is a copy of the first data set from the portions of data according to the manifest.

18. The method of claim 17, wherein reconstructing includes reconstructing a data stream from the portions of data.

19. The method of claim 17, wherein resolving redundancy includes identifying and removing redundant data from the portions of data to reconstruct the copy of the first data set from the portions of data.

20. The method of claim 17, further including recovering the portions of data to reconstruct the copy of the first data set according to a distribution and retrieval policy.

* * * * *